United States Patent
Nakatsugawa (10) Patent No.: US 6,714,762 B2
(45) Date of Patent: Mar. 30, 2004

(54) RADIO COMMUNICATION SYSTEM, RADIO COMMUNICATION METHOD, AND RECORDING MEDIUM FOR STORING A PROGRAM FOR SELECTION OF A REPEATER IN RADIO COMMUNICATION SYSTEM

(75) Inventor: Yoshinori Nakatsugawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 613 days.

(21) Appl. No.: 09/780,496

(22) Filed: Feb. 12, 2001

(65) Prior Publication Data

US 2001/0014586 A1 Aug. 16, 2001

(30) Foreign Application Priority Data

Feb. 14, 2000 (JP) ........................................ P2000-35824

(51) Int. Cl.[7] .................................................. H04B 7/14
(52) U.S. Cl. .......................................... 455/13.1; 455/7
(58) Field of Search ........................ 455/13.1, 73, 103, 455/524, 525, 7, 11.1; 370/392, 16

(56) References Cited

U.S. PATENT DOCUMENTS 4,451,916 A * 5/1984 Casper et al. .................. 714/4
5,596,439 A * 1/1997 Dankberg et al. ............. 398/35
5,819,155 A * 10/1998 Worthy et al. ............. 455/2.01
6,470,012 B2 * 10/2002 Nakatsugawa ............... 370/392

OTHER PUBLICATIONS

U.S. patent application Ser. No. 09/065,461, filed Apr. 24, 1998, pending.
U.S. patent application Ser. No. 09/780,496, filed Feb. 12, 2001, pending.

* cited by examiner

*Primary Examiner*—Nay Maung
*Assistant Examiner*—Tan Trinh
(74) *Attorney, Agent, or Firm*—Oblon, Spivak, McClelland, Maier & Neustadt, P.C.

(57) ABSTRACT

A radio communication system of this invention includes: terminals for sending a connection request through broadcast, detecting a reception condition when a connection request echo sent back is received as a terminal reception condition and sending it through broadcast; plural repeaters for detecting a reception condition when the connection request is received as a repeater reception condition, sending a connection request echo including this repeater reception condition and sending back a terminal reception condition echo to a master repeater when it receives a terminal reception condition; and a master repeater for when receiving the connection request echo and terminal reception condition, selecting a repeater securing an optimum communication state based on the repeater reception condition and terminal reception condition.

7 Claims, 7 Drawing Sheets

| | | R1 | R2 | R3 |
|---|---|---|---|---|
| N1 | TERMINAL RECEPTION CONDITION — ANTENNA POWER (mW) | 4 | 2 | 1 |
| | TERMINAL RECEPTION CONDITION — BIT ERROR | $1\times10^{-3}$ OR LESS | $1\times10^{-3}$ OR LESS | $1\times10^{-2}$ |
| | REPEATER RECEPTION CONDITION — ANTENNA POWER (mW) | 4 | 2 | 1 |
| | REPEATER RECEPTION CONDITION — BIT ERROR | $1\times10^{-3}$ OR LESS | $1\times10^{-3}$ OR LESS | $5\times10^{-3}$ |
| | SUM — ANTENNA POWER (mW) | 8 | 4 | 2 |
| | SUM — BIT ERROR | $1\times10^{-3}$ OR LESS | $1\times10^{-3}$ OR LESS | $1.5\times10^{-2}$ |
| N2 | TERMINAL RECEPTION CONDITION — ANTENNA POWER (mW) | 0.05 | 2 | 1 |
| | TERMINAL RECEPTION CONDITION — BIT ERROR | $5\times10^{-2}$ OR MORE | $1\times10^{-3}$ OR LESS | $8\times10^{-3}$ |
| | REPEATER RECEPTION CONDITION — ANTENNA POWER (mW) | 0.03 | 2 | 1 |
| | REPEATER RECEPTION CONDITION — BIT ERROR | $5\times10^{-2}$ OR MORE | $1\times10^{-3}$ OR LESS | $6\times10^{-3}$ |
| | SUM — ANTENNA POWER (mW) | 0.08 | 4 | 2 |
| | SUM — BIT ERROR | $1\times10^{-1}$ OR MORE | $1\times10^{-3}$ OR LESS | $1.4\times10^{-3}$ |
| N3 | TERMINAL RECEPTION CONDITION — ANTENNA POWER (mW) | 1 | 4 | 0.05 |
| | TERMINAL RECEPTION CONDITION — BIT ERROR | $1\times10^{-3}$ OR LESS | $1\times10^{-3}$ OR LESS | $5\times10^{-2}$ OR MORE |
| | REPEATER RECEPTION CONDITION — ANTENNA POWER (mW) | 1 | 4 | 0.02 |
| | REPEATER RECEPTION CONDITION — BIT ERROR | $1\times10^{-3}$ OR LESS | $1\times10^{-3}$ OR LESS | $5\times10^{-2}$ OR MORE |
| | SUM — ANTENNA POWER (mW) | 2 | 8 | 0.07 |
| | SUM — BIT ERROR | $1\times10^{-3}$ OR LESS | $1\times10^{-3}$ OR LESS | $1\times10^{-1}$ OR MORE |
| N4 | TERMINAL RECEPTION CONDITION — ANTENNA POWER (mW) | $4\times10^{-3}$ | 2 | 4 |
| | TERMINAL RECEPTION CONDITION — BIT ERROR | 1 | $1\times10^{-3}$ OR LESS | $1\times10^{-3}$ OR LESS |
| | REPEATER RECEPTION CONDITION — ANTENNA POWER (mW) | $2\times10^{-3}$ | 2 | 4 |
| | REPEATER RECEPTION CONDITION — BIT ERROR | 1 | $1\times10^{-3}$ OR LESS | $1\times10^{-3}$ OR LESS |
| | SUM — ANTENNA POWER (mW) | $6\times10^{-3}$ | 4 | 8 |
| | SUM — BIT ERROR | 2 | $1\times10^{-3}$ OR LESS | $1\times10^{-3}$ OR LESS |
| -------- | | | | |

FIG. 7

RADIO COMMUNICATION SYSTEM, RADIO COMMUNICATION METHOD, AND RECORDING MEDIUM FOR STORING A PROGRAM FOR SELECTION OF A REPEATER IN RADIO COMMUNICATION SYSTEM

CROSS REFERENCE TO RELATED APPLICATION

This application claims benefit of priority under 35 U.S.C. § 119 to Japanese Patent Application No. 2000-35824, filed on Feb. 14, 2000, the entire contents of which are incorporated by reference herein.

BACKGROUND OF THE INVENTION

1. Field of the Invention

The present invention relates to a radio communication system in which a terminal communicates by radio through a repeater, and more particularly to a radio communication system allowing continuous communication under an environment where shielding objects move by selecting a terminal in an optimum receiving condition, a radio communication method and a recording medium for storing a program for selection of a repeater in the radio communication system.

2. Description of the Related Art

In a conventional radio communication for communicating with a moving terminal through a public communication network, if field intensity of electronic wave received by the moving terminal weakens, the moving terminal switches its base station so as to continue the communication.

Figure 1:
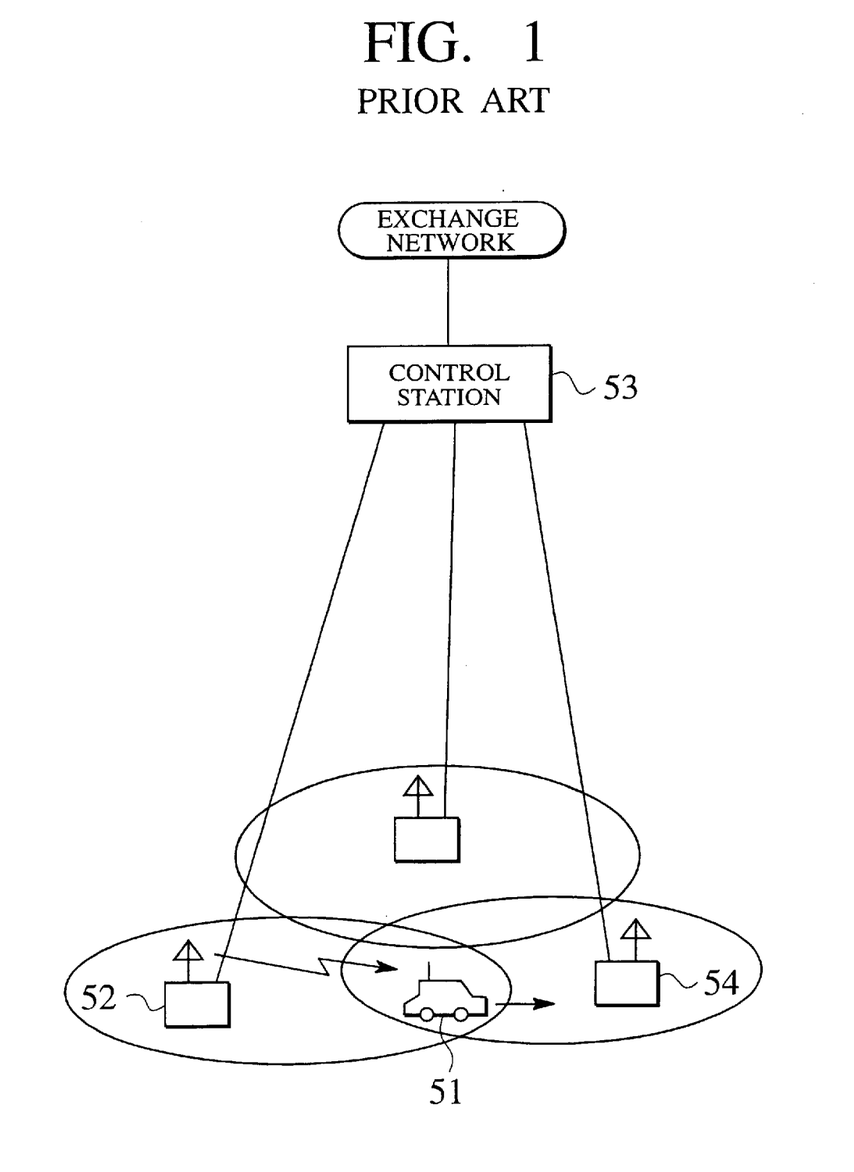
FIG. 1 is a diagram for explaining a conventional radio communication system using a public communication network.

Here, a radio communication system using the conventional public communication network will be described with reference to FIG. 1. In the radio communication system shown in FIG. 1, field intensity of electronic wave received by a moving terminal 51 is detected.

If the field intensity of the received electronic wave weakens as this moving terminal 51 moves, the moving terminal 51 dispatches a communication channel switching request to a base station 52 on communication. This switching request is sent from the base station 52 to a control station 53 and then, this control station 53 notifies the moving terminal 51 of a base station 54 which has the highest receiving level of plural base stations from which the moving terminal 51 can receive electronic wave as a new base station. Consequently, the moving terminal 51 can switch communication to the base station 54 located in an area to which the moving terminal 51 moves, so that it can continue communication during moving.

In this radio communication system, when switching the base station, a communication channel between the moving terminal 51 and the base station 52 on communication is kept and if a new communication channel capable of communicating at a receiving level from the base station 54 located in an area to which the moving terminal 51 moves is found, communication with the base station 54 is started through the new communication channel.

This conventional radio communication system produces no problems under a communication system which assumes that field intensity drops gradually when the moving terminal 51 moves as seen in a wide area based on the public communication network and allows communication through a currently used communication channel in a while during the moving. However, the conventional radio communication system cannot be applied to such an environment in which the field intensity drops suddenly when the terminal or shielding object moves like in communication in a small area.

Particularly, the field intensity is proportional to 1/(distance)$^2$ and thus depends upon a distance between the moving terminal and base station. In case where the unit of distance is large like in communication system using the public communication network, even if the distance changes more or less, the field intensity never changes largely. However, if the unit of distance is small like in indoor radio communication system in vehicle compartment or factory, the field intensity changes largely due to a slight change of the distance.

Further, the indoor radio communication system employs a minute or small output power. Thus, if such a shielding object as wall, man, chair or equipment moves near communication path, electronic wave damps largely even if the distance is not changed, so that communication maybe sometimes disabled.

Figure 2:
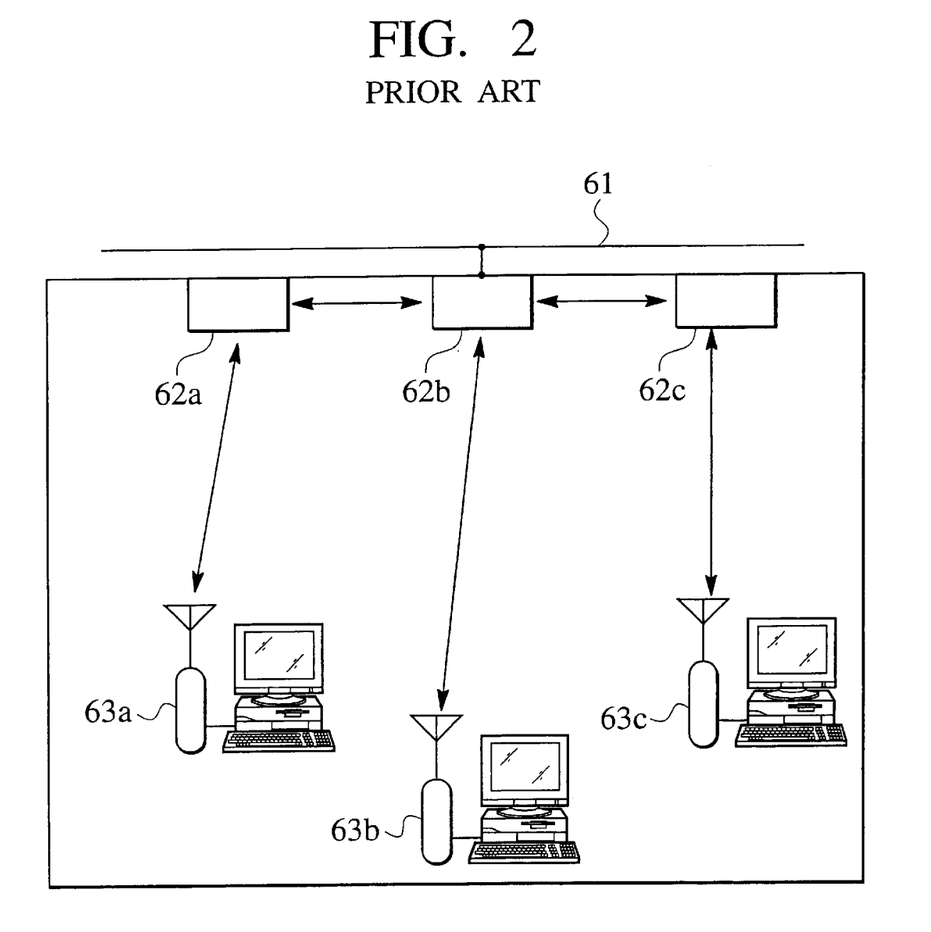
FIG. 2 is a diagram for explaining a conventional radio LAN system in a room.

In indoor radio LAN system shown in FIG. 2, repeaters 62a, 62b, 62c connected to the wired LAN 61 are provided on ceiling and terminals 63a, 63b, 63c are communicating with a repeater located just vertically above. That is, the terminal 63a is communicating with the repeater 62a, the terminal 63b is communicating with the repeater 62b and the terminal 63c is communicating with the repeater 62c. Consequently, this radio communication system lowers a possibility that communication between the terminal and repeater is interrupted.

This radio LAN system can secure a sufficient space just vertically above the terminal and any shielding object never enters between the repeater and the terminal. Further, the above described problem can be solved under an environment in which the terminal and shielding object are semi-fixed, like office. However, there is a possibility that any shielding object may enter between the terminal and the repeater under such an environment in which no sufficient space can be secured as the vehicle compartment and factory, so that the above-described problem cannot be solved.

SUMMARY OF THE INVENTION

The present invention has been achieved in views of the above described problem and therefore an object of the present invention is to provide a radio communication system capable of securing continuous communication even under an environment in which no sufficient space can be secured and a terminal or shielding object moves, by selecting a repeater which secures an optimum communication state from plural repeaters, a radio communication method thereof and a recording medium for storing a program for selection of a repeater in radio communication system.

To achieve the above described object, according to an aspect of the invention, there is provided a radio communication system for a terminal to carry out radio communication through a repeater securing an optimum communication state selected from plural repeaters, wherein a reception condition of a repeater when each of plural repeaters receives a connection request sent from the terminal through broadcast is detected as a repeater reception condition and a reception condition of a terminal when the terminal receives a connection request echo sent from the plural repeaters after receiving the connection request is detected as a terminal reception condition so as to select a repeater securing an optimum communication state based on the terminal reception condition and the repeater reception condition.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

Further, to achieve the above object, according to another aspect of the invention, there is provided a radio communication system for a terminal to carry out radio communication through a repeater securing an optimum communication state selected by a path management repeater from plural repeaters, the system comprising: a terminal for sending a connection request for starting radio communication through broadcast, receiving a connection request echo sent back by a repeater receiving the connection request so as to detect a reception condition at this time as a terminal reception condition and sending the terminal reception condition through broadcast; plural repeaters for receiving the connection request sent by the terminal so as to detect a reception condition at this time as a repeater reception condition, sending the connection request echo including the repeater reception condition to the terminal and the path management repeater and when receiving the terminal reception condition sent by the terminal, sending the terminal reception condition to the path management repeater; and a path management repeater for receiving the connection request sent by the terminal so as to detect a reception condition at this time as a repeater reception condition, sending the connection request echo including the repeater reception condition to the terminal and when receiving the connection request echo sent by the plural repeaters and the terminal reception condition sent by the terminal or the plural repeaters, selecting a repeater securing an optimum communication state based on the repeater reception condition and the terminal reception condition.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

According to still another aspect of the invention, there is provided a radio communication system for a terminal to carry out radio communication through a repeater securing an optimum communication state selected from plural repeaters, the system comprising: a terminal for sending a connection request for starting radio communication through broadcast, receiving a connection request echo sent back by a repeater receiving the connection request so as to detect a reception condition at this time as a terminal reception condition and selecting a repeater securing an optimum communication state based on the terminal reception condition and a repeater reception condition included in the connection request echo; and plural repeaters for receiving the connection request sent by the terminal so as to detect a reception condition at this time as the repeater reception condition and sending the connection request echo including the repeater reception condition to said terminal.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

Further, to achieve the above described object, according to a further aspect of the invention, there is provided a radio communication method for a terminal to carry out radio communication through a repeater securing an optimum communication state selected by a path management repeater from plural repeaters, the method comprising: a connection request sending step of said terminal's sending a connection request for starting radio communication through broadcast; a repeater reception condition detecting step of when the connection request sent in the connection request sending step is received by the plural repeaters and the path management repeater, detecting a reception condition at this time as a repeater reception condition; a connection request echo sending step of sending a connection request echo including the repeater reception condition detected in the repeater reception condition detecting step to the terminal and the path management repeater; a terminal reception condition detecting step of when the terminal receives the connection request echo sent in the connection request echo sending step, detecting a reception condition at this time as a terminal reception condition; a terminal reception condition sending step of sending the terminal reception condition detected in the terminal reception condition detecting step through broadcast; a terminal reception condition echo sending step of when the plural repeaters receive the terminal reception condition sent in the terminal reception condition sending step, sending back the terminal reception condition to the path management repeater; and a repeater selection step of when the path management repeater receives the terminal reception condition sent in the terminal reception condition echo sending step or the terminal reception condition sending step and further receives the connection request echo sent back in the connection request echo sending step, selecting a repeater securing an optimum communication state based on the terminal reception condition and the repeater reception condition.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

Further, to achieve the above described object, according to a still further aspect of the invention, there is provided a radio communication method for a terminal to carry out radio communication through a repeater securing an optimum communication state selected from plural repeaters, the method comprising: a connection request sending step of the terminal's sending a connection request for starting radio communication through broadcast; a repeater reception condition detecting step of when the connection request sent in the connection request sending step is received by the plural repeaters, detecting a reception condition at this time as a repeater reception condition; a connection request echo sending step of sending a connection request echo including the repeater reception condition detected in the repeater reception condition detecting step to the terminal; a terminal reception condition detecting step of when the terminal receives the connection request echo sent in the connection request echo sending step, detecting a reception condition at this time as a terminal reception condition; and a repeater selection step of selecting a repeater securing an optimum communication state based on the terminal reception condition detected in the terminal reception condition detecting step and the repeater reception condition included in the connection request echo.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

To achieve the above described object, according to a yet still further aspect of the present invention, there is provided a recording medium for storing a program for selection of a repeater in radio communication system for a terminal to carry out radio communication through a repeater securing an optimum communication state selected by a path management repeater from plural repeaters, the program including: a connection sending request processing for the terminal's sending a connection request for starting radio communication through broadcast; a repeater reception condition detecting processing for, when the connection request sent in the connection request sending processing is received by the plural repeaters and the path management repeater, detecting a reception condition at this time as a repeater reception condition; a connection request echo sending processing for sending a connection request echo including the repeater reception condition detected in the repeater reception condition detecting processing to the terminal and the path management repeater; a terminal reception condition detecting processing for, when the terminal receives the connection request echo sent in the connection request echo sending processing, detecting a reception condition at this time as a terminal reception condition; a terminal reception condition sending processing for sending the terminal reception condition detected in the terminal reception condition detecting processing through broadcast; a terminal reception condition echo sending processing for, when the plural repeaters receive the terminal reception condition sent in the terminal reception condition sending processing, sending back the terminal reception condition to the path management repeater; and a repeater selection processing for, when the path management repeater receives the terminal reception condition sent in the terminal reception condition echo sending processing or the terminal reception condition sending processing and further receives the connection request echo sent back in the connection request echo sending processing, selecting a repeater securing an optimum communication state based on the terminal reception condition and the repeater reception condition.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

To achieve the above described object, according to a yet still further aspect of the present invention, there is provided a recording medium for storing a program for selection of a repeater in radio communication system for a terminal to carry out radio communication through a repeater securing an optimum communication state selected from plural repeaters, the program including: a connection request sending processing for the terminal's sending a connection request for starting radio communication through broadcast; a repeater reception condition detecting processing for, when the connection request sent in the connection request sending processing is received by the plural repeaters, detecting a reception condition at this time as a repeater reception condition; a connection request echo sending processing for sending a connection request echo including the repeater reception condition detected in the repeater reception condition detecting processing to the terminal; a terminal reception condition detecting processing for, when the terminal receives the connection request echo sent in the connection request echo sending processing, detecting a reception condition at this time as a terminal reception condition; and a repeater selection processing for selecting a repeater securing an optimum communication state based on the terminal reception condition detected in the terminal reception condition detecting processing and the repeater reception condition included in said connection request echo.

According to the present invention, communication is carried out always by selecting a repeater securing an optimum communication with each terminal. Therefore, this communication method enables continuous communication to be carried out under such an environment in which no sufficient space can be secured and a terminal and a shielding object move, as vehicle compartment and factory.

The nature, principle and utility of the invention will become more apparent from the following detailed description when read in conjunction with the accompanying drawings.

DESCRIPTION OF THE PREFERRED EMBODIMENTS

Hereinafter, the structure of the radio communication system of this embodiment will be described with reference to FIG. 3.

Figure 3:
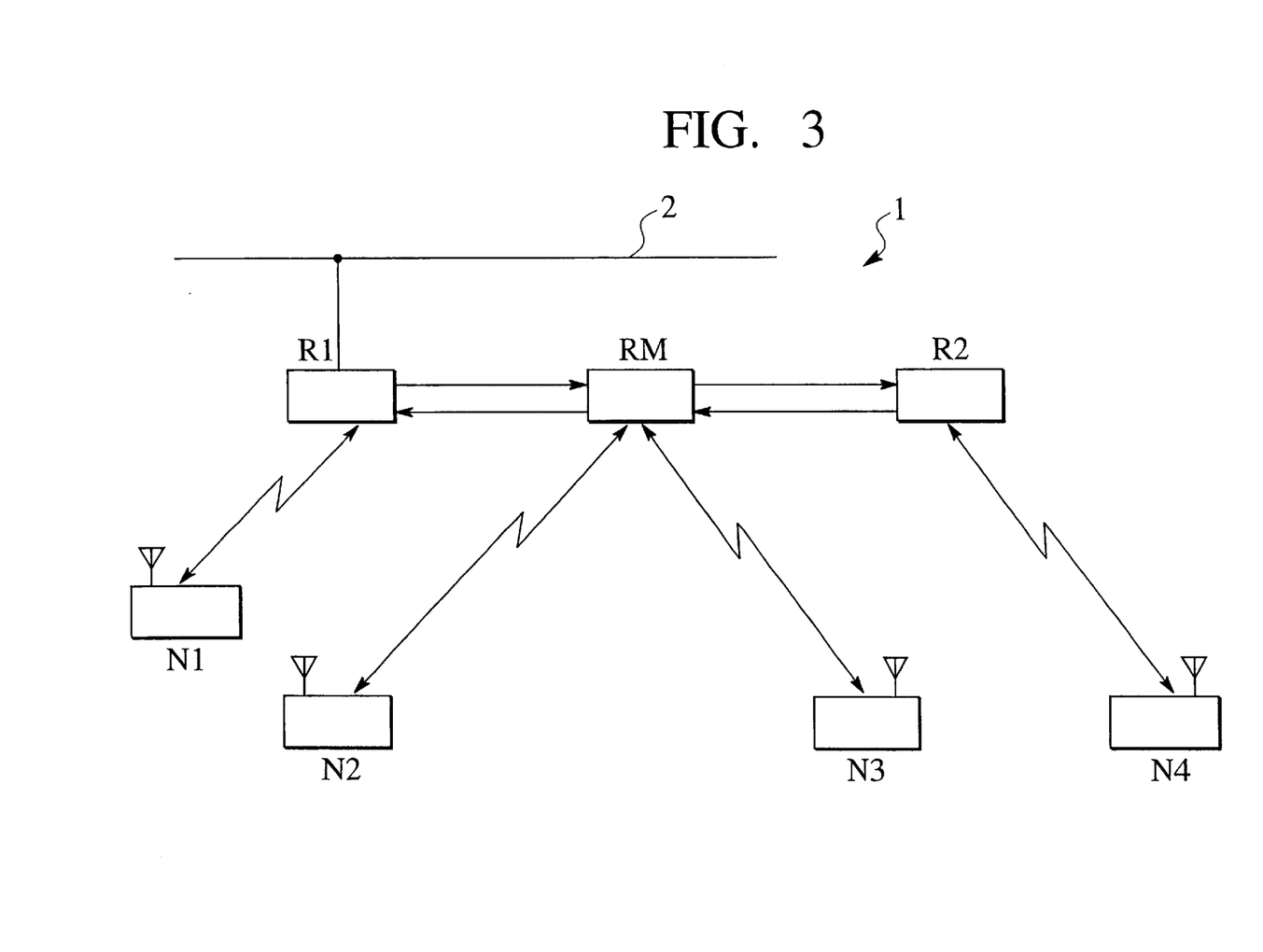
FIG. 3 is a block diagram showing an embodiment of a radio communication system of the present invention.

As shown in FIG. 3, the radio communication system of this embodiment comprises plural repeaters RM, R1, R2 and plural terminals N1, . . . , N4 which communicate with these plural repeaters RN, R1, R2 by radio.

Of the plural repeaters RM, R1, R2 shown in FIG. 3, the repeater RM serves for a master repeater. This master repeater generates a synchronous signal to ensure synchronism between the repeaters and distributes synchronous signal to ensure synchronism between the master repeater and other repeaters. Additionally, the master repeater carries out address initialization, communication channel management and the like.

The repeaters RM, R1, R2 have the same hardware configuration and a repeater, which becomes a master through a predetermined procedure out of the plural repeaters, becomes a master repeater. This predetermined procedure is different depending on application, for example, a repeater which rises up earliest when power is turned ON becomes a master repeater a repeater which has the lowest address becomes a mater repeater or the mater is determined by manual setting or a repeater closest to a predetermined apparatus is selected as the master repeater.

Communication between respective repeaters is set up in a condition capable of securing a complete communication irrespective of wire communication or radio communication. The repeater R1 is assumed to be connected to the wired LAN 2.

Here, the hardware configuration of the respective repeaters RM, R1, R2 will be described with reference to FIG. 4.

Figure 4:
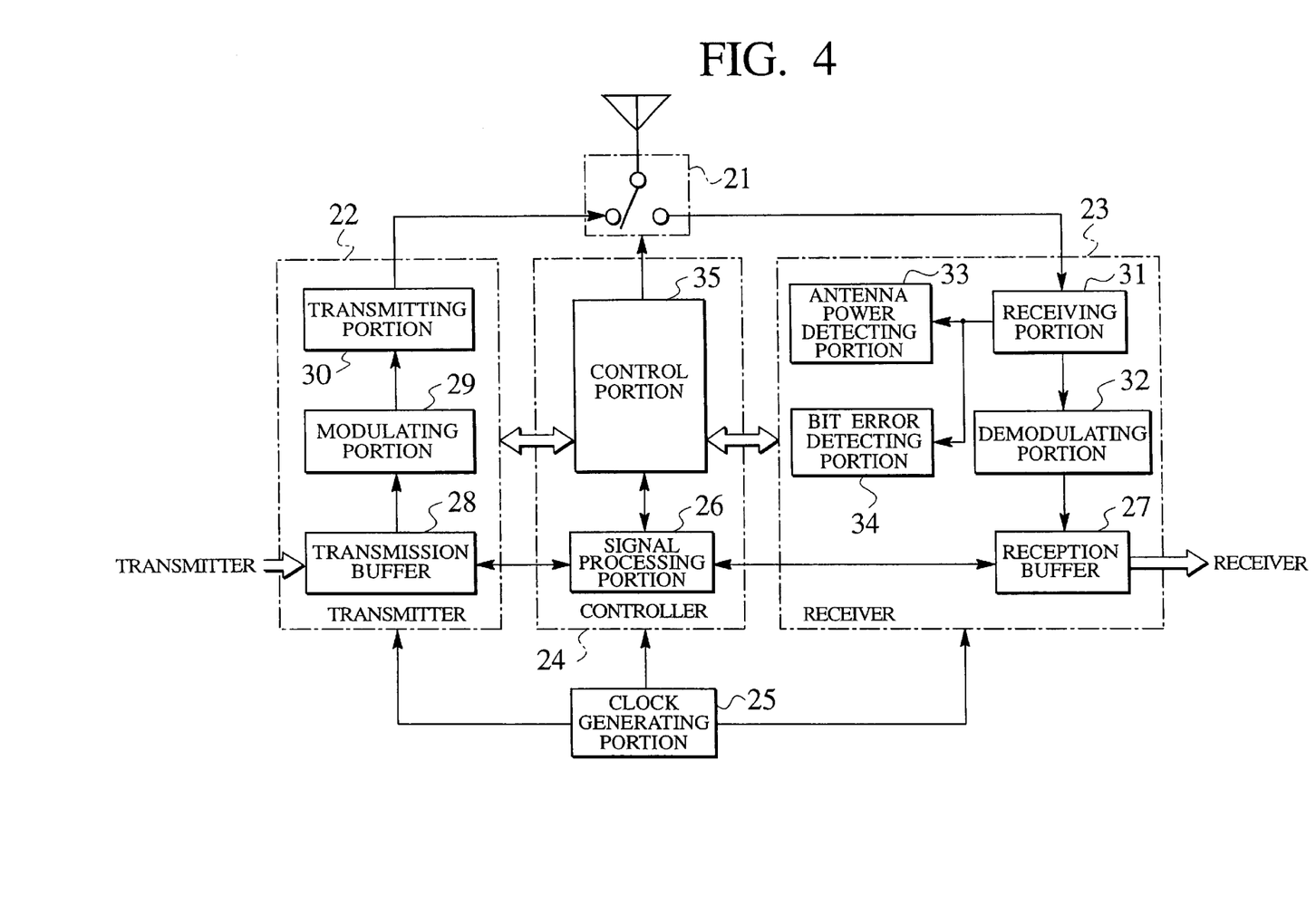
FIG. 4 is a block diagram showing an example of hardware configuration composed of repeaters and terminals shown in FIG. 3.

As shown in FIG. 4, each repeater comprises an antenna 21 for sending or receiving electronic wave, a transmitter 22 for transmitting electronic wave through this antenna 21, a receiver 23 for receiving electronic wave through the antenna 21, a controller 24 for controlling the transmitter 22 and the receiver 23 and a clock generating portion 25 for providing these units with clock signal.

The transmitter 22 includes a transmission buffer 28 for holding transmission data of other repeaters sent from a reception buffer 27 of the receiver 23 through a signal processing portion 26 of the controller 24 and transmission data sent from the transmitter, a modulating portion 29 for modulating transmission data and a transmitting portion 30 for transmitting transmission data modulated by the modulating portion 29.

The receiver 23 includes a receiving portion 31 for receiving transmission data, a demodulating portion 32 for demodulating transmission data received by this receiving portion 31 and a reception buffer 27 for holding transmission data sent from the demodulating portion 32 and transmission data sent from the transmission buffer 28 of the transmitter 22 through the signal processing portion 26 of the controller 24. Data received by the receiver 23 is sent to an antenna power detecting portion 33 and a bit error detector 34 and then, data held by the reception buffer 27 is sent to a receiver and the transmission buffer 28.

The controller 24 comprises a signal processing portion 26 for carrying out signal processing including attachment of transmission data destination, sender's name and the like and a controller 35 for controlling the signal processing portion 26, transmitter 22 and receiver 23 and switching antenna transmission/reception state and the like.

The terminals N1, . . . , N4 has the same configuration as the hardware configuration shown in FIG. 4.

The controllers of the repeater and terminal has computer system including a CPU for carrying out various processings and a memory for storing instructions of this processings. An instruction for each processing contained in the control portion and timing restriction are held in the memory and loaded on the CPU as required for execution.

Next, a selecting processing for a repeater in the radio communication system of this embodiment will be described with reference to a flow chart shown in FIG. 5.

First, a terminal intending to start communication dispatches a connection request through broadcast (S301). Therefore, this connection request can be received by every repeater in which field intensity of received electronic wave is over a predetermined level and transmission error is below a predetermined level.

Then, if the master repeater RM and repeaters R1, R2, which receive this connection request, detect antenna power of a received connection request and bit error reception condition (repeater reception condition) (S302), a connection request echo containing this repeater reception condition is sent back to the terminal (S303). This connection request echo is sent back from each repeater by time-division multiplexing and contains information such as address of every repeater, antenna power, bit error and the like. Further, the repeaters R1, R2 sends back the same connection request echo to the master repeater RM.

Although in this step S303, the connection request echo is transmitted to the terminal and the master repeater RM at the same time, the connection request echo may be sent to the master repeater RM after it is sent back to the terminal. If communication between respective repeaters is so constructed to be carried out by radio, it is not necessary for each repeater to transmit the connection request echo to the master repeater and the terminal separately and thus the master repeater may receive the connection request echo from each repeater at the same time as the terminal receives it.

Figure 5:
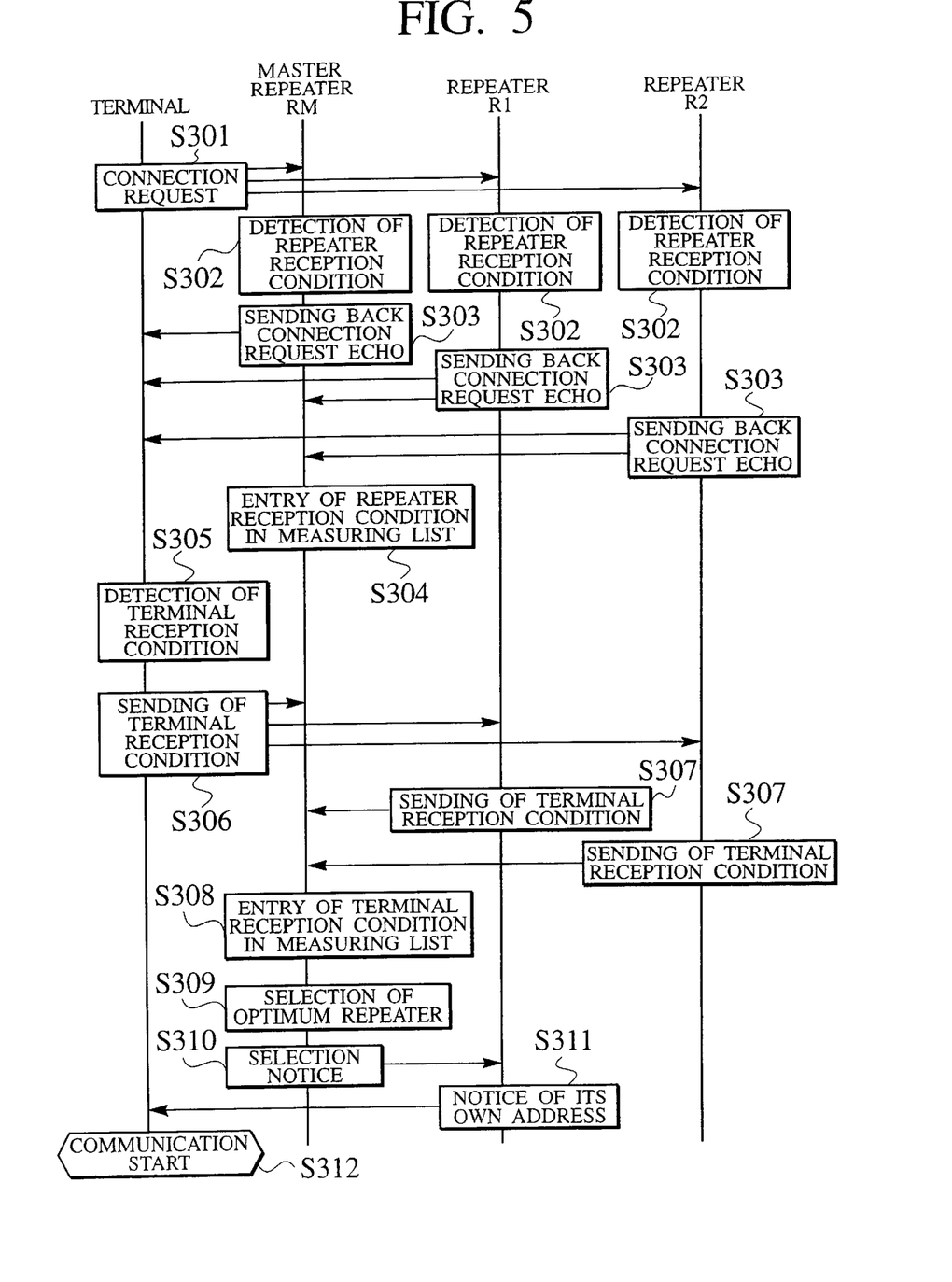
FIG. 5 is a flow chart for explaining selective processing of an optimum repeater in the radio communication system shown in FIG. 3.
Figure 6:
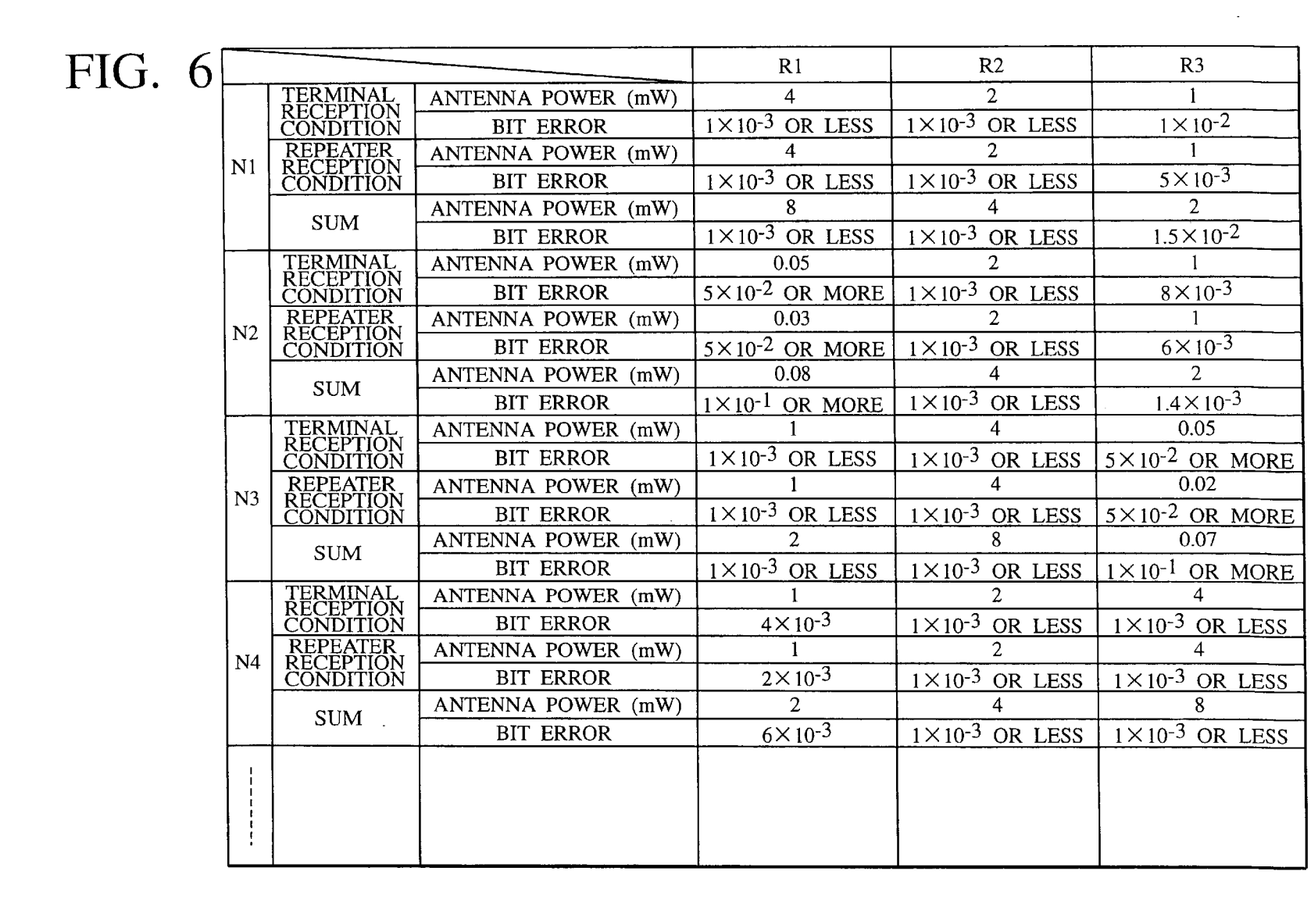
FIG. 6 is a diagram showing an example of a repeater selection table.

After receiving the connection request echo, the master repeater RM fills in columns of a measuring list shown in FIG. 6 with antenna power and bit error of repeater reception condition, according to information such as antenna power and bit error contained in the connection request echo (S304).

On the other hand, if the terminal receives a connection request echo sent from the master repeater RM and repeaters R1, R2, it detects a reception condition (terminal reception condition) when that connection request echo is received (S305) and the terminal reception condition is sent to the master repeater RM and repeaters R1, R2 through broadcast (S306). This terminal reception condition includes information about antenna power for each address in the repeater, bit error and the like.

Then, after receiving this terminal reception condition, the repeaters R1, R2 sends back the terminal reception condition to the master repeater RM (S307).

The reason why the terminal reception condition is sent to all the repeaters through broadcast and the repeater receiving it sends back the terminal reception condition to the master repeater RM is that the master repeater RM is not always capable of communicating with the terminal. That is, if when communication is disabled due to a shielding object existing between the terminal and the master repeater RM, a repeater capable of receiving the terminal reception condition is set to send back the terminal reception condition to the master repeater RM, the master repeater can receive the terminal reception condition even if it cannot communicate with the terminal.

If the master repeater RM receives the terminal reception condition sent from the terminal or the terminal reception condition sent from the repeaters R1, R2, the master repeater RM fills in columns of the measuring list shown in FIG. 6 with antenna power, bit error and the like according to the received terminal reception condition (S308).

Then, after the terminal reception condition and repeater reception condition in the measuring list of FIG. 6 are entered, the master repeater RM selects an optimum repeater (S309).

First, sum of the antenna powers and sum of bit errors are computed for each repeater. Then, a repeater in which the sum of the bit errors is below a predetermined value and the sum of the antenna powers becomes maximum is selected as an optimum repeater.

As for determination about the bit error according to the measuring list of FIG. 6, it is determined that "less than $1\times10^{-3}$ is absence of the bit error, " "more than $1\times10^{-3}$ to less than $5\times10^{-2}$ is error correction enable (presence of bit error) and "more than $5\times10^{-2}$" is error correction disable (presence of bit error).

According to a result of determination about the optimum repeater based on the measuring list of FIG. 6, for the terminal N1, because antenna power of the terminal N1 with the repeater R1 is maximum and bit error thereof is minimum, the repeater R1 is selected as the optimum repeater. For the terminal N2, not the repeater R1 located nearby but the repeater R2 in which antenna power is maximum while bit error thereof is minimum is selected as the optimum repeater. Further, for the terminal N3, not the repeater R3 located nearby but the repeater R2 in which antenna power is maximum while bit error thereof is minimum is selected as the optimum repeater. For the terminal N4, the repeater R3 is selected as the optimum repeater because antenna power with the repeater R3 is maximum while bit error thereof is minimum.

After an optimum repeater is selected according to the above process, the master repeater RM sends the selected optimum repeater (repeater R1 for the terminal N1 of FIG. 6) a selection notice in order to notify the selected optimum repeater that it is selected (S310). If the optimum repeater receives that selection notice, it notifies the terminal of its own address (S311). After the terminal receives that address, it starts communication with the optimum repeater (S312).

Although the flow chart of FIG. 5 indicates a case where an operation of a path management repeater, which manages the path by selecting the optimum repeater, is carried out by the master repeater, an operation of the path management repeater may be carried out by other repeater than the master repeater RM, namely, repeater R1 or repeater R2.

Further, although the flow chart of FIG. 5 shows a case where broadcast is carried out in steps S301, S306, it is permissible to employ multi-cast in which predetermined plural repeaters' addresses are specified.

Further, although the flow chart of FIG. 5 shows a case where a connection request occurs from a terminal, if electric field intensity of electronic wave drops during communication, communication path may be changed in the same procedure.

If a drop of field intensity is detected on the terminal side, the terminal sends a path change request instead of the connection request of FIG. 5 or sends a connection request again. By selecting an optimum repeater in the same procedure as FIG. 5, communication with a repeater which ensures optimum communication condition is continued.

If a drop of electric field intensity is detected on the repeater side, the repeater sends the path change notice to the terminal. If the terminal receives such a path change notice, it sends a path change request instead of the connection request of FIG. 5. By selecting the optimum repeater in the same procedure as FIG. 5, communication with a repeater which ensures optimum communication state can be continued.

Further, if a drop of field intensity is detected on the terminal side and repeater side substantially at the same time, the path is changed in the same procedure.

In the radio communication system of this embodiment, a repeater which ensures optimum communication with each terminal is always selected so as to carry out communication. Thus, continuous communication can be secured under an environment in which no sufficient space can be obtained while the terminal and shielding objects move around, for example, vehicle compartment, factory, airplane and ship.

Needless to say, continuous communication is enabled when the terminal or shielding object moves in office or house in which a space is relatively easy to secure.

Next, a radio communication according to a second embodiment will be described.

The second embodiment is different from the first embodiment in that the optimum repeater is selected by the terminal. Because the structure of the radio communication system of this embodiment is the same as the first embodiment shown in FIG. 3 except the master repeater RM is repeater R3, a description thereof is omitted.

Next, a selecting processing for the repeater in the radio communication system of this embodiment will be described with reference to a flow chart shown in FIG. 7.

First, a terminal intending to start communication sends a connection request through broadcast (S501). Therefore, this connection request can be received by all repeaters in which electric field intensity of received electronic wave is less than a predetermined level and transmission error thereof is less than a predetermined level.

The repeaters R1, R2, R3, which receive this connection request, detect such a reception condition (repeater reception condition) as antenna power and bit error in the received connection request (S502) and then send the connection request echo including this repeater reception condition back to the terminal (S503). This connection request echo is transmitted from each repeater by time-division multiplexing and contains information such as address of each repeater, antenna power, bit error and the like.

A terminal, which receives this connection request echo, detects a reception condition (terminal reception condition) such as antenna power and bit error when it receives the connection request echo (S504).

Then, according to information about the antenna power and bit error detected in this step S504, the terminal fills in the columns of the measuring list shown in FIG. 6 with antenna power and bit error of a receiving terminal and then, according to the antenna power and bit error contained in the connection request echo, the terminal fills in the columns of the measuring list shown in FIG. 6 with antenna power and bit error of the receiving repeater (S505).

After filling in the measuring list of FIG. 6 with the terminal reception condition and repeater reception condition, the terminal computes sum of the antenna powers and sum of bit errors for each repeater like the first embodiment. Then, it selects an optimum repeater in which the sum of the bit errors is less than a predetermined value and the sum of the antenna powers becomes maximum, as an optimum repeater (S506).

If such an optimum repeater is selected, the terminal sends a selection notice through broadcast in order to notify that the optimum repeater (repeater R in FIG. 7) has been selected (S507). Then, after receiving this, selection notice, the optimum repeater sends a selection notice echo containing its own address and the like to the terminal (S508). After receiving the selection notice echo, the terminal starts communication with the optimum repeater (S509).

Figure 7:
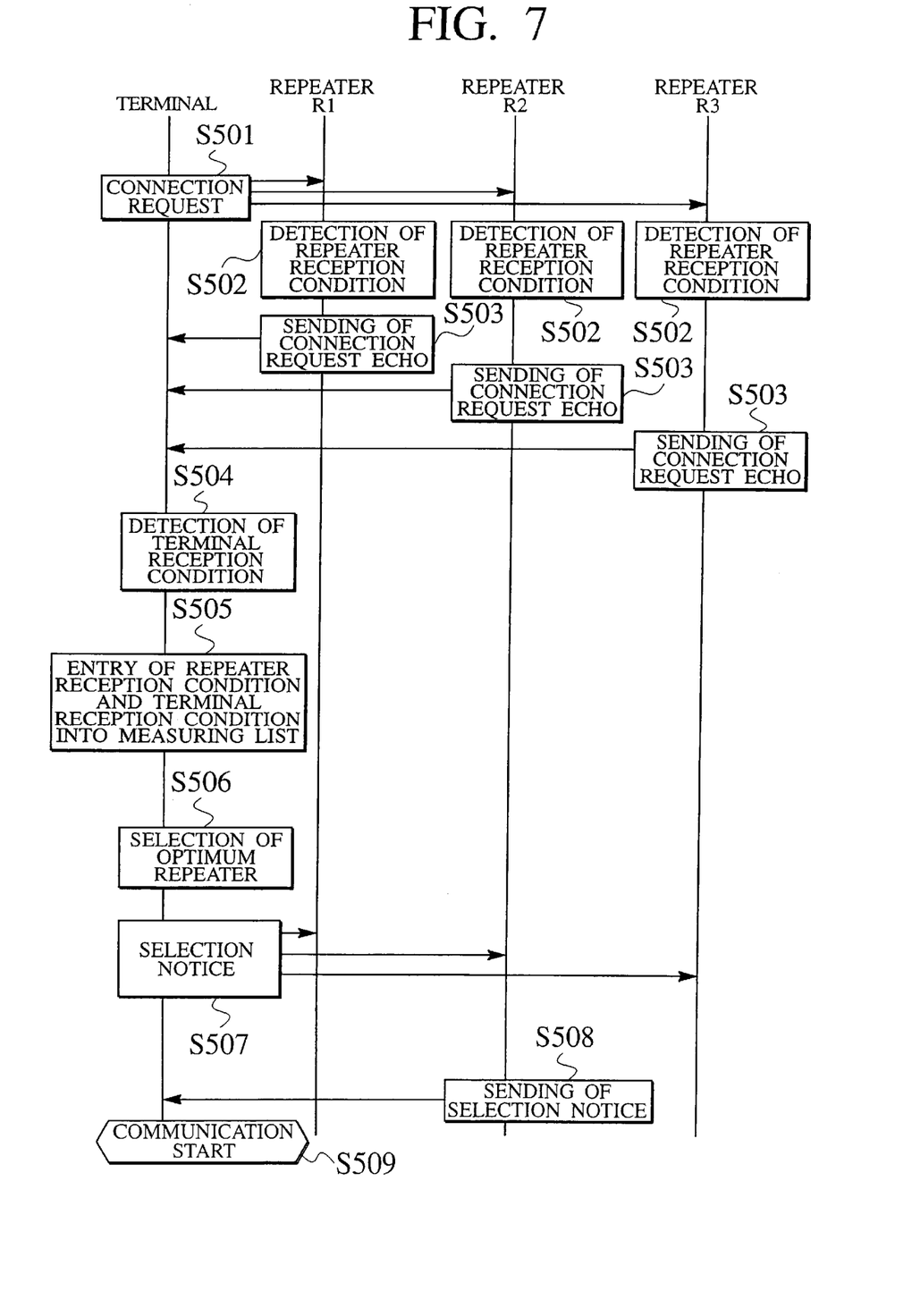
FIG. 7 is a flow chart for explaining selective processing of an optimum repeater in the radio communication system according to the second embodiment.

Although the flow chart shown in FIG. 7 shows a case where broadcast is carried out in steps S501, S507, it is permissible to employ multi-cast in which predetermined plural repeaters are specified.

Although the flow chart shown in FIG. 7 shows a case where the connection request arises from the terminal, the communication path may be changed in the same procedure if electric field intensity of electronic wave drops during communication.

If the terminal detects a drop of the field intensity, the path change request is sent instead of the connection request or the connection request shown in FIG. 7 is sent again in order to select an optimum repeater in the same procedure as shown in FIG. 7. Consequently, communication with a repeater which secures an optimum communication state can be continued.

If the repeater detects a drop of electric field intensity, the repeater sends a path change notice to the terminal. After receiving this path change notice, the terminal sends a path change request instead of the connection request shown in FIG. 7. By selecting the optimum repeater in the same procedure as shown in FIG. 7, communication with a repeater which ensures optimum communication state can be continued.

If the drop of the field intensity is detected substantially at the same time on the terminal and repeater sides, the path is changed in the same procedure.

As described above, according to the radio communication system of this embodiment, communication is carried out always by selecting a repeater which ensures an optimum communication with the terminal. Therefore, continuous communication can be secured under such an environment in which no sufficient space can be secured and a terminal and a shielding object move as vehicle compartment, factory, airplane and ship. Needless to say, continuous communication can be secured when the terminal and shielding object move in office and house in which a space is relatively easy to secure.

A program for achieving respective processings in the above described radio communication system can be stored in a recording medium. Because this recording medium can be read into a computer system, the respective processings of the aforementioned radio communication system can be achieved by executing the aforementioned program to control the computer. The aforementioned recording medium mentioned here includes a memory device, magnetic disc device, optical disc device and the like, which can store the program.

It should be understood that many modifications and adaptations of the invention will become apparent to those skilled in the art and it is intended to encompass such obvious modifications and changes in the scope of the claims appended hereto.

What is claimed is:

1. A radio communication system for a terminal to carry out radio communication through a repeater securing an optimum communication state selected from plural repeaters, wherein a reception condition of a repeater when each of plural repeaters receives a connection request sent from the terminal through broadcast is detected as a repeater reception condition and a reception condition of a terminal when said terminal receives a connection request echo sent from said plural repeaters after receiving said connection request is detected as a terminal reception condition so as to select a repeater securing an optimum communication state based on said terminal reception condition and said repeater reception condition.

2. A radio communication system for a terminal to carry out radio communication through a repeater securing an optimum communication state selected by a path management repeater from plural repeaters, the system comprising:

a terminal for sending a connection request for starting radio communication through broadcast, receiving a connection request echo sent back by a repeater receiving said connection request so as to detect a reception condition at this time as a terminal reception condition and sending the terminal reception condition through broadcast;

plural repeaters for receiving said connection request sent by said terminal so as to detect a reception condition at this time as a repeater reception condition, sending said connection request echo including the repeater reception condition to said terminal and said path management repeater and when receiving said terminal reception condition sent by said terminal, sending the terminal reception condition to said path management repeater; and a path management repeater for receiving said connection request sent by said terminal so as to detect a reception condition at this time as a repeater reception condition, sending said connection request echo including the repeater reception condition to said terminal and when receiving said connection request echo sent by said plural repeaters and said terminal reception condition sent by said terminal or said plural repeaters, selecting a repeater securing an optimum communication state based on said repeater reception condition and said terminal reception condition.

3. A radio communication system for a terminal to carry out radio communication through a repeater securing an optimum communication state selected from plural repeaters, the system comprising:

a terminal for sending a connection request for starting radio communication through broadcast, receiving a connection request echo sent back by a repeater receiving said connection request so as to detect a reception condition at this time as a terminal reception condition and selecting a repeater securing an optimum communication state based on the terminal reception condition and a repeater reception condition included in said connection request echo; and plural repeaters for receiving said connection request sent by said terminal so as to detect a reception condition at this time as the repeater reception condition and sending said connection request echo including the repeater reception condition to said terminal.

4. A radio communication method for a terminal to carry out radio communication through a repeater securing an optimum communication state selected by a path management repeater from plural repeaters, the method comprising:

a connection request sending step of said terminal's sending a connection request for starting radio communication through broadcast;

a repeater reception condition detecting step of when said connection request sent in said connection request sending step is received by said plural repeaters and said path management repeater, detecting a reception condition at this time as a repeater reception condition;

a connection request echo sending step of sending a connection request echo including said repeater reception condition detected in the repeater reception condition detecting step to said terminal and said path management repeater;

a terminal reception condition detecting step of when said terminal receives said connection request echo sent in the connection request echo sending step, detecting a reception condition at this time as a terminal reception condition;

a terminal reception condition sending step of sending said terminal reception condition detected in the terminal reception condition detecting step through broadcast;

a terminal reception condition echo sending step of when said plural repeaters receive said terminal reception condition sent in the terminal reception condition sending step, sending back the terminal reception condition to said path management repeater; and a repeater selection step of when said path management repeater receives said terminal reception condition sent in the terminal reception condition echo sending step or the terminal reception condition sending step and further receives said connection request echo sent back in the connection request echo sending step, selecting a repeater securing an optimum communication state based on said terminal reception condition and said repeater reception condition.

5. A radio communication method for a terminal to carry out radio communication through a repeater securing an optimum communication state selected from plural repeaters, the method comprising:

a connection request sending step of said terminal's sending a connection request for starting radio communication through broadcast;

a repeater reception condition detecting step of when said connection request sent in said connection request sending step is received by said plural repeaters, detecting a reception condition at this time as a repeater reception condition;

a connection request echo sending step of sending a connection request echo including said repeater reception condition detected in the repeater reception condition detecting step to said terminal;

a terminal reception condition detecting step of when said terminal receives said connection request echo sent in the connection request echo sending step, detecting a reception condition at this time as a terminal reception condition; and a repeater selection step of selecting a repeater securing an optimum communication state based on said terminal reception condition detected in the terminal reception condition detecting step and said repeater reception condition included in said connection request echo.

6. A recording medium for storing a program for selection of a repeater in radio communication system for a terminal to carry out radio communication through a repeater securing an optimum communication state selected by a path management repeater from plural repeaters, the program including:

a connection sending request processing for said terminal's sending a connection request for starting radio communication through broadcast;

a repeater reception condition detecting processing for, when said connection request sent in said connection request sending processing is received by said plural repeaters and said path management repeater, detecting a reception condition at this time as a repeater reception condition;

a connection request echo sending processing for sending a connection request echo including said repeater reception condition detected in the repeater reception condition detecting processing to said terminal and said path management repeater;

a terminal reception condition detecting processing for, when said terminal receives said connection request echo sent in the connection request echo sending processing, detecting a reception condition at this time as a terminal reception condition;

a terminal reception condition sending processing for sending said terminal reception condition detected in the terminal reception condition detecting processing through broadcast;

a terminal reception condition echo sending processing for, when said plural repeaters receive said terminal reception condition sent in the terminal reception condition sending processing, sending back the terminal reception condition to said path management repeater; and a repeater selection processing for, when said path management repeater receives said terminal reception condition sent in the terminal reception condition echo sending processing or the terminal reception condition sending processing and further receives said connection request echo sent back in the connection request echo sending processing, selecting a repeater securing an optimum communication state based on said terminal reception condition and said repeater reception condition.

7. A recording medium for storing a program for selection of a repeater in radio communication system for a terminal to carry out radio communication through a repeater securing an optimum communication state selected from plural repeaters, the program including:

a connection request sending processing for said terminal's sending a connection request for starting radio communication through broadcast;

a repeater reception condition detecting processing for, when said connection request sent in said connection request sending processing is received by said plural repeaters, detecting a reception condition at this time as a repeater reception condition;

a connection request echo sending processing for sending a connection request echo including said repeater reception condition detected in the repeater reception condition detecting processing to said terminal;

a terminal reception condition detecting processing for, when said terminal receives said connection request echo sent in the connection request echo sending processing, detecting a reception condition at this time as a terminal reception condition; and a repeater selection processing for selecting a repeater securing an optimum communication state based on said terminal reception condition detected in the terminal reception condition detecting processing and said repeater reception condition included in said connection request echo.

* * * * *